United States Patent
Maeyama et al.

(10) Patent No.: US 9,821,824 B2
(45) Date of Patent: Nov. 21, 2017

(54) VEHICLE AND TRACK TRANSPORTATION SYSTEM

(71) Applicant: MITSUBISHI HEAVY INDUSTRIES, LTD., Tokyo (JP)

(72) Inventors: Hiroyuki Maeyama, Tokyo (JP); Takahiro Suzuki, Tokyo (JP); Kousuke Katahira, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 53 days.

(21) Appl. No.: 14/648,110

(22) PCT Filed: Jan. 29, 2013

(86) PCT No.: PCT/JP2013/051866
§ 371 (c)(1),
(2) Date: May 28, 2015

(87) PCT Pub. No.: WO2014/118880
PCT Pub. Date: Aug. 7, 2014

(65) Prior Publication Data
US 2015/0314796 A1    Nov. 5, 2015

(51) Int. Cl.
*G05D 1/00*    (2006.01)
*B61L 3/00*    (2006.01)
(Continued)

(52) U.S. Cl.
CPC ........... *B61L 3/00* (2013.01); *B61B 13/00* (2013.01); *B61B 13/04* (2013.01); *B61L 23/041* (2013.01);
(Continued)

(58) Field of Classification Search
CPC . B61B 13/00; B61B 13/04; B61L 3/00; B61L 23/041; B61L 27/04; G05D 1/021
See application file for complete search history.

(56) References Cited

U.S. PATENT DOCUMENTS 6,237,504 B1 * 5/2001 Tanahashi ............... B62D 1/265
104/243
6,477,963 B1 * 11/2002 Weule .................... B62D 1/265
104/243
(Continued)

FOREIGN PATENT DOCUMENTS

JP    S52-020637 B2    6/1977
JP    S57-075318 A     5/1982
(Continued)

OTHER PUBLICATIONS

PCT/ISA/210, "International Search Report for International Application No. PCT/JP2013/051866," dated May 7, 2013.
(Continued)

*Primary Examiner* — Ian Jen
(74) *Attorney, Agent, or Firm* — Manabu Kanesaka; Benjamin Hauptman; Kenneth Berner

(57) ABSTRACT

A vehicle includes running wheels traveling on traveling road surfaces of tracks; a pair of position detection parts disposed at an interval in a width direction that output signals by detecting a distance from measured objects; a control unit controlling the amount of steering of the running wheels according to the signals from the position detection parts; and a steering mechanism steering the running wheels via the control unit. Each of the position detection parts outputs a signal having characteristics such that the output increases as the distance from the measured objects increases while an output change ratio is decreased in a range wherein the distance from the measured objects is not less than a predetermined value, and is configured such that, when the distance between one position detection part and the measured object is decreased, the distance between the other position detection part and the measured object is increased.

13 Claims, 8 Drawing Sheets

(51) Int. Cl.
*G05D 1/02* (2006.01)
*B61B 13/00* (2006.01)
*B61B 13/04* (2006.01)
*B61L 23/04* (2006.01)
*B61L 27/04* (2006.01)
*B61L 25/02* (2006.01)

(52) U.S. Cl.
CPC ............. *B61L 27/04* (2013.01); *G05D 1/021* (2013.01); *B61L 25/026* (2013.01); *B61L 2201/00* (2013.01)

(56) References Cited

U.S. PATENT DOCUMENTS

| | | | | |
|---|---|---|---|---|
| 6,768,298 | B2* | 7/2004 | Katragadda | G01N 27/902 324/217 |
| 7,987,026 | B2* | 7/2011 | Yi | A63H 19/32 701/19 |
| 8,209,091 | B2* | 6/2012 | Morichika | B61B 10/04 701/41 |
| 8,234,022 | B2* | 7/2012 | Morichika | B61B 10/04 701/19 |
| 8,408,142 | B2* | 4/2013 | Maeyama | B61B 13/00 104/242 |
| 8,600,591 | B2* | 12/2013 | Weber | B61C 17/12 246/126 |
| 8,761,972 | B2* | 6/2014 | Morichika | B61B 10/04 104/106 |
| 8,831,800 | B2* | 9/2014 | Parienti | G05D 1/0234 180/167 |
| 9,061,690 | B2* | 6/2015 | Kanemori | B61B 10/04 |
| 2002/0089238 | A1* | 7/2002 | Rudy | G01B 5/0002 310/12.09 |
| 2002/0100151 | A1* | 8/2002 | Urbanzyk | B29C 55/165 26/89 |
| 2006/0144129 | A1* | 7/2006 | Farritor | B61K 9/08 73/81 |
| 2006/0200280 | A1* | 9/2006 | Kono | B62D 1/265 701/19 |
| 2011/0175606 | A1* | 7/2011 | Koyama | B82Y 25/00 324/252 |
| 2011/0231039 | A1* | 9/2011 | Leitel | B60T 8/1893 701/19 |
| 2012/0143426 | A1* | 6/2012 | Yamamoto | B60W 20/13 701/22 |

FOREIGN PATENT DOCUMENTS

| | | |
|---|---|---|
| JP | S60-134308 A | 7/1985 |
| JP | S61-072309 A | 4/1986 |
| JP | S62-287309 A | 12/1987 |
| JP | S63-047975 U | 3/1988 |
| JP | H02-045809 A | 2/1990 |
| JP | H08-320997 A | 12/1996 |
| JP | 2739262 B2 | 4/1998 |
| JP | H10-207539 A | 8/1998 |
| JP | H10-207540 A | 8/1998 |
| JP | 2001-125638 A | 5/2001 |
| JP | 2001-165605 A | 6/2001 |
| JP | 2001-273033 A | 10/2001 |
| JP | 2002-236912 A | 8/2002 |
| JP | 2003-102293 A | 4/2003 |
| JP | 3775200 B2 | 5/2006 |
| JP | 2007-052730 A | 3/2007 |
| JP | 4370268 B2 | 11/2009 |
| JP | 4801637 B2 | 10/2011 |
| WO | 2004/040391 A1 | 5/2004 |
| WO | 2009/011141 A1 | 1/2009 |

OTHER PUBLICATIONS

PCT/ISA/237, "Written Opinion of the International Searching Authority for International Application No. PCT/JP2013/051866," dated May 7, 2013.
Singapore Patent Office, "Office Action for Singaporean Patent Application No. 11201504194X," Jun. 7, 2016.

* cited by examiner

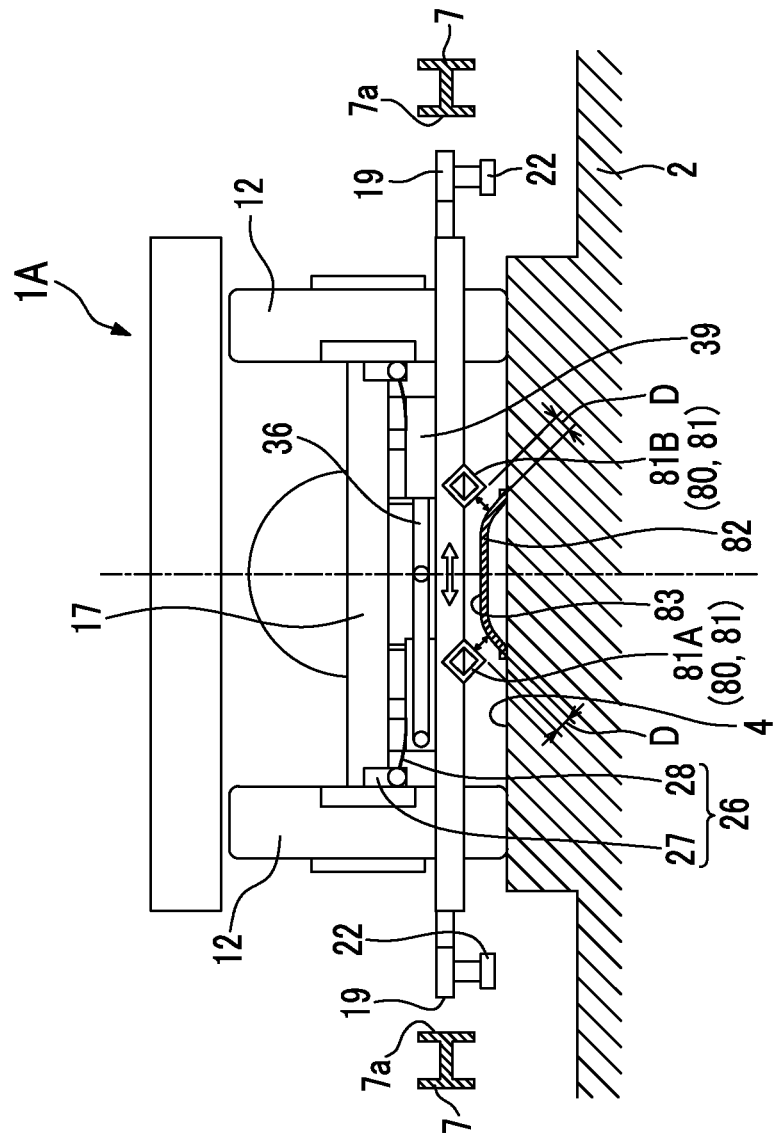

VEHICLE AND TRACK TRANSPORTATION SYSTEM

RELATED APPLICATIONS

The present application is National Phase of International Application No. PCT/JP2013/051866 filed Jan. 29, 2013, the disclosure of which is hereby incorporated by reference herein in its entirety.

TECHNICAL FIELD

The present invention relates to a vehicle that can be automatically steered, and a track transportation system that includes a track on which the vehicle travels.

BACKGROUND ART

A track transportation system in which a vehicle travels on a track by using running wheels formed of rubber tires and guide wheels of the vehicle are guided by guide rails is known as new means of transportation other than a bus and a railroad. This track transportation system is generally called a new transport system or an Automated People Mover (APM).

Further, there are a side guide method and a center guide method as a steering method in this kind of new transport system. All of these steering methods are a so-called passive steering method in which a vehicle is guided through the guiding of guide wheels by guide rails. The side guide method of these methods is a method of guiding a vehicle by guiding guide wheels, which are provided on both sides of a vehicle, by guide rails provided on both sides of a track. A clearance is formed between the guide rail and the guide wheel and part of the guide wheels provided on both sides of the vehicle always come into contact with the guide rails.

Since part of the guide wheels always come into contact with the guide rails in this passive steering method, the guide rails are bent or there is a difference in level at the connecting portions of continuous guide rails. For this reason, there is a problem in that vibration is generated and comfort deteriorates while the vehicle travels. Accordingly, there is considered a technique for improving comfort by making the vehicle travel by an automatic steering function so that the guide wheels do not come into contact with the guide rails.

Here, PTL 1 discloses a steering control device that receives a magnetic field generated from magnetic markers provided on a course by a sensor of a vehicle and controls the steering of the vehicle so that the vehicle travels on the course.

CITATION LIST

Patent Literature

[PTL 1] Japanese Unexamined Patent Application Publication No. 2001-273033

SUMMARY OF INVENTION

Technical Problem

However, only a fact that the magnetic markers are provided at a predetermined interval can be obtained in PTL 1. For this reason, the vehicle is steered using wheel speed sensors or the like and travels while estimating a travel course. Accordingly, since control is very complicated, control delay occurs during the high-speed travel of the vehicle. For this reason, it is difficult to make a vehicle stably travel on the track so that the vehicle does not deviate from a desired travel course by a certain range or more.

The invention provides a track transportation system that can make a vehicle more reliably travel on a desired course by simple control.

Solution to Problem

According to a first aspect of the invention, there is provided a vehicle including: running wheels that travel on a traveling road surface of a track; a pair of position detection parts that are provided with an interval therebetween in a width direction, and detect distances between themselves and an object to be measured provided on the track along an extending direction of the traveling road surface, and output signals; a control unit that controls the amount of steering of the running wheels according to the signals output from the position detection parts; and a steering mechanism that steers the running wheels by the control unit. Each of the position detection parts outputs, as the signal, a signal having characteristics in which an output is increased as the distance from the object to be measured is increased and a rate of change of the output is reduced in a range in which the distance from the object to be measured is equal to or larger than a predetermined value, and is provided so that the distance between the other position detection part and the object to be measured is increased when the distance between one position detection part and the object to be measured is reduced. The control unit controls the amount of steering according to a combined output of the signals output from the pair of the position detection parts.

According to the track transportation system, after the distances between the position detection parts and the object to be measured are detected by the position detection parts, the outputs of the signals output from the respective position detection parts are combined with each other by the control unit. Here, in a region in which one position detection part is close to the object to be measured and the other position detection part is distant from the object to be measured (hereinafter, referred to as a first region), the output of one position detection part is changed with a higher rate of change as the distance from the object to be measured is reduced, and the rate of change of the output of the other position detection part is reduced (an output signal becomes flat) while the output of the other position detection part is large. Accordingly, when the output of one position detection part as a positive numerical value and the output of the other position detection part as a negative numerical value are combined with each other, an output signal of a combined output is changed with a higher rate of change in the first region.

Further, conversely, in a region in which one position detection part is distant from the object to be measured and the other position detection part is close to the object to be measured (hereinafter, referred to as a second region), the rate of change of the output of one position detection part is reduced while the output of one position detection part is large, and the output of the other position detection part is changed with a higher rate of change as the other position detection part approaches the object to be measured. Accordingly, when the output of one position detection part as a positive numerical value and the output of the other position detection part as a negative numerical value are combined with each other, an output signal of a combined output is changed with a higher rate of change in the second region.

Furthermore, in a region in which the distance between one position detection part and the object to be measured is substantially equal to the distance between the other position detection part and the object to be measured, that is, in an intermediate region between the first and second regions, a transition state between a state in which the output of each position detection part is greatly changed and a state in which the rate of change of the output of the position detection part is low appears. Accordingly, even when the output of one position detection part as a positive numerical value and the output of the other position detection part as a negative numerical value are combined with each other, the transition state in which the output signal is gently changed in comparison with the first and second regions appears in the intermediate region.

As the position of the vehicle is changed from a case in which the object to be measured and one position detection part are close to each other to a case in which the object to be measured and one position detection part are distant from each other as described above, the combined output of the two position detection parts is changed to the first region, the intermediate region, and the second region. Accordingly, after the output signal of the combined output is changed with a higher rate of change, the transition state in which the output signal is gently changed appears. Then, the output signal of the combined output is changed with a high rate of change again. Therefore, the output characteristics of the signals output from the position detection parts are set so that the output signal of the combined output is positioned in the intermediate region when the vehicle is present at a predetermined desired position in the width direction and the output signal of the combined output is positioned in the first and second regions when the vehicle deviates from the predetermined position. Accordingly, when the vehicle deviates from the predetermined position, the vehicle can be controlled according to a combined output signal having a high rate of change so as to promptly return to the predetermined position. Further, when the vehicle is close to the predetermined position, steering control can be moderately performed according to a combined output signal that has a low rate of change and corresponds to the transition state. For this reason, when steering control is performed so that the vehicle returns to the predetermined position, it is possible to suppress the overshooting of the vehicle from the predetermined position and to suppress the meandering travel of the vehicle that is caused by the repetition of this movement of the vehicle. Accordingly, it is possible to make the vehicle reliably travel on a desired course on the traveling road surface in the width direction.

Further, according to a second aspect of the invention, in the vehicle according to the first aspect, the pair of position detection parts may output the signals so that a rate of change of the combined output of the signals is increased, when the vehicle travels at a position deviating from a middle position on the traveling road surface in the width direction and the rate of change of the combined output of the signals is reduced when the vehicle travels at the middle position.

Since the output characteristics of the signals output from the position detection parts are selected as described above, the vehicle can be controlled so as to promptly return to the middle position when the vehicle travels at a position deviating from the middle position in the width direction, and steering control can be moderately performed when the vehicle is close to the middle position. For this reason, since it is possible to suppress the meandering travel of the vehicle from the middle position, it is possible to make the vehicle reliably travel at the middle position on the travel road in the width direction.

Furthermore, according to a third aspect of the invention, there is provided a track transportation system including: the vehicle according to the first or second aspect; a track that includes a traveling road surface on which the vehicle travels; an operational control unit that allows the vehicle to travel according to an operational plan by controlling supply of power to the vehicle; and an object to be measured that is provided on the track along an extending direction of the traveling road surface.

According to this track transportation system, the track transportation system makes the vehicle travel by the operational control unit and controls the amount of steering by the control unit using the combined output of the pair of position detection parts that detect the distance from the object to be measured. Accordingly, when the vehicle travels at a position deviating from the predetermined position on the traveling road surface of the track in the width direction, the vehicle can be controlled so as to promptly return to the predetermined position. Further, when the vehicle is close to the predetermined position, steering control can be moderately performed. For this reason, since it is possible to suppress the meandering travel of the vehicle from the predetermined position, it is possible to make the vehicle reliably travel at the predetermined position on the traveling road surface in the width direction.

In addition, according to a fourth aspect of the invention, in the track transportation system according to the third aspect, each of the position detection parts may include a sensor having characteristics in which an output of the signal is increased as a distance from the object to be measured is increased and a rate of change of the output of the signal is reduced in a range in which the distance from the object to be measured is equal to or larger than a predetermined value, and the object to be measured may be a guide face of a guide rail that extends in the extending direction of the traveling road surface so as to cross the traveling road surface.

In the track transportation system, the guide rail is provided on the track and the vehicle travels while being guided by the guide face of the guide rail. Accordingly, since an object to be measured does not need to be installed anew, it is possible to make the vehicle reliably travel on a desired course by simple steering control, which uses a combined output of sensors, while reducing costs.

Moreover, according to a fifth aspect of the invention, in the track transportation system according to the fourth aspect, the sensor may be an eddy current sensor.

When the eddy current sensor is applied, the rate of change of the output is reduced, that is, the output is saturated as the distance from the object to be measured is increased. Accordingly, it is possible to make the vehicle reliably travel on a desired course by simple steering control that uses a combined output of sensors.

Further, according to a sixth aspect of the invention, in the track transportation system according to the third aspect, each of the position detection parts may include a sensor having characteristics in which an output of the signal is increased as the distance from the object to be measured is reduced, and the object to be measured may be formed in a shape in which a distance between the object to be measured and the sensor is reduced as the object to be measured approaches the sensor in the width direction and a rate of change of the distance is reduced in a range in which the distance between the object to be measured and the sensor is equal to or smaller than a predetermined value.

According to the track transportation system, the sensor of each position detection part has output characteristics in which an output is increased or reduced so as to correspond to the increase and reduction of the distance from the object to be measured. That is, since an output signal of the sensor is monotonously increased or reduced, it is possible to obtain an output signal, which corresponds to the shape of the object to be measured, in the position detection part by using this sensor. Here, the object to be measured is formed in a shape in which a distance between the object to be measured and the sensor is reduced as the sensor approaches the object to be measured in the width direction of the traveling road surface and a rate of change of the distance is reduced in a range in which the distance between the object to be measured and the sensor is equal to or smaller than a predetermined value. Accordingly, specifically, in a region in which one sensor is distant from the object to be measured in the width direction and the other sensor is close to the object to be measured in the width direction (hereinafter, referred to as a first region), the output of one position detection part is changed with a higher rate of change as the sensor becomes distant from the object to be measured, and the rate of change of the output of the other position detection part is reduced (an output signal becomes flat) while the output of the other position detection part is large. Accordingly, when the output of one position detection part as a positive numerical value and the output of the other position detection part as a negative numerical value are combined with each other, an output signal of a combined output is changed with a higher rate of change in the first region.

Further, conversely, in a region in which one sensor is close to the object to be measured and the other sensor is distant from the object to be measured (hereinafter, referred to as a second region), the rate of change of the output of one position detection part is reduced while the output of one position detection part is large, and the output of the other position detection part is changed with a higher rate of change as the sensor becomes distant from the object to be measured. Accordingly, when the output of one position detection part as a positive numerical value and the output of the other position detection part as a negative numerical value are combined with each other, an output signal of a combined output is changed with a higher rate of change in the second region.

Furthermore, in a region in which the distance between one sensor and the object to be measured is substantially equal to the distance between the other sensor and the object to be measured, that is, in an intermediate region between the first and second regions, a transition state between a state in which the output of each position detection part is greatly changed and a state in which the rate of change of the output of the position detection part is low appears. Accordingly, even when the output of one position detection part as a positive numerical value and the output of the other position detection part as a negative numerical value are combined with each other, the transition state in which the output signal is gently changed in comparison with the first and second regions appears in the intermediate region. Therefore, since it is possible to suppress the meandering travel of the vehicle by controlling the vehicle according to the output signal of the combined output, it is possible to make the vehicle reliably travel on a desired course on the traveling road surface in the width direction.

According to a seventh aspect of the invention, in the track transportation system according to the sixth aspect, the sensor may be a laser sensor.

When the laser sensor is applied, it is possible to obtain an output signal that monotonously varies linearly. For this reason, since it is possible to output signals, which correspond to the shape of the object to be measured, from the position detection parts, it is possible to make the vehicle reliably travel on a desired course on the traveling road surface in the width direction by simple steering control that uses a combined output.

Advantageous Effects of Invention

According to the vehicle and the track transportation system of the invention, since steering control is performed using a combined output that is obtained through the combination of outputs of a pair of position detection parts, it is possible to make a vehicle more reliably travel on a desired course by simple control.

BRIEF DESCRIPTION OF DRAWINGS

FIG. 8 is a view showing main parts of a running device of a track transportation system according to a second embodiment of the invention and shows a cross-section at the same position as the cross-section taken along line A-A of FIG. 3.

DESCRIPTION OF EMBODIMENTS

First Embodiment

A track transportation system (hereinafter, simply referred to as a transport system) 1 according to the first embodiment of the invention will be described below.

Figure 1:
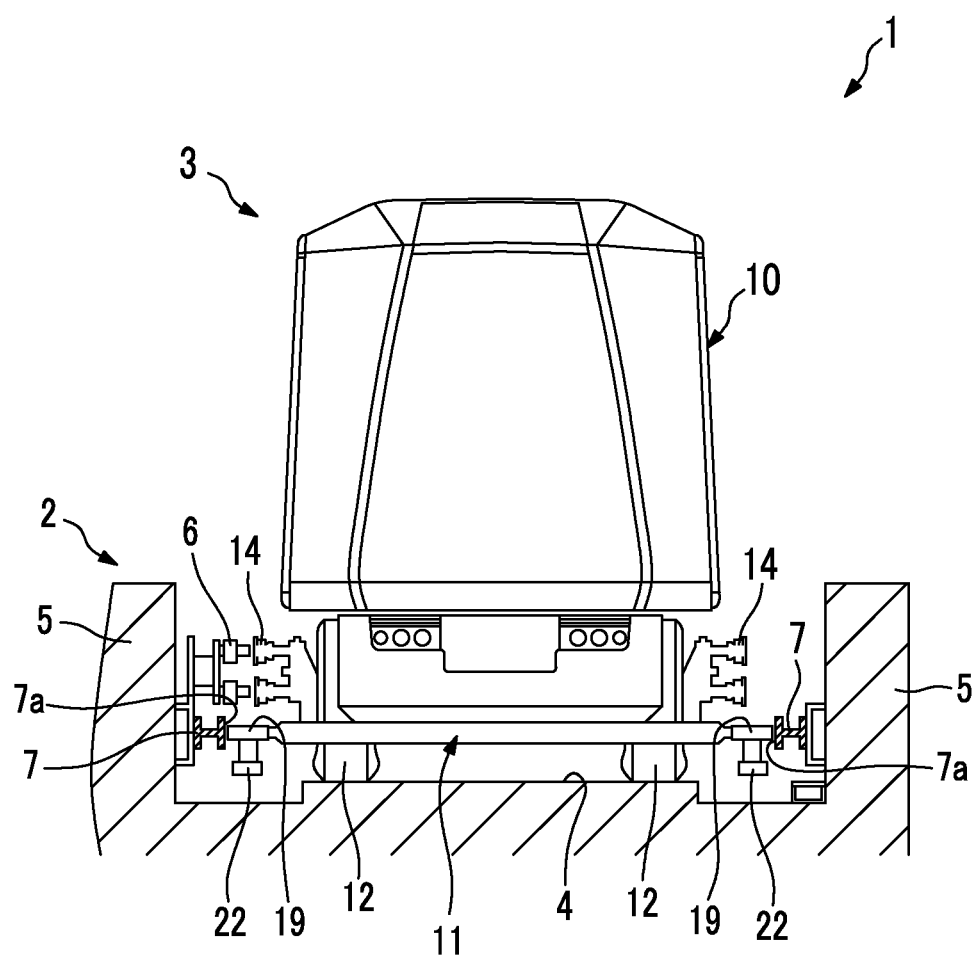
FIG. 1 is a front view of a track transportation system according to a first embodiment of the invention.
Figure 2:
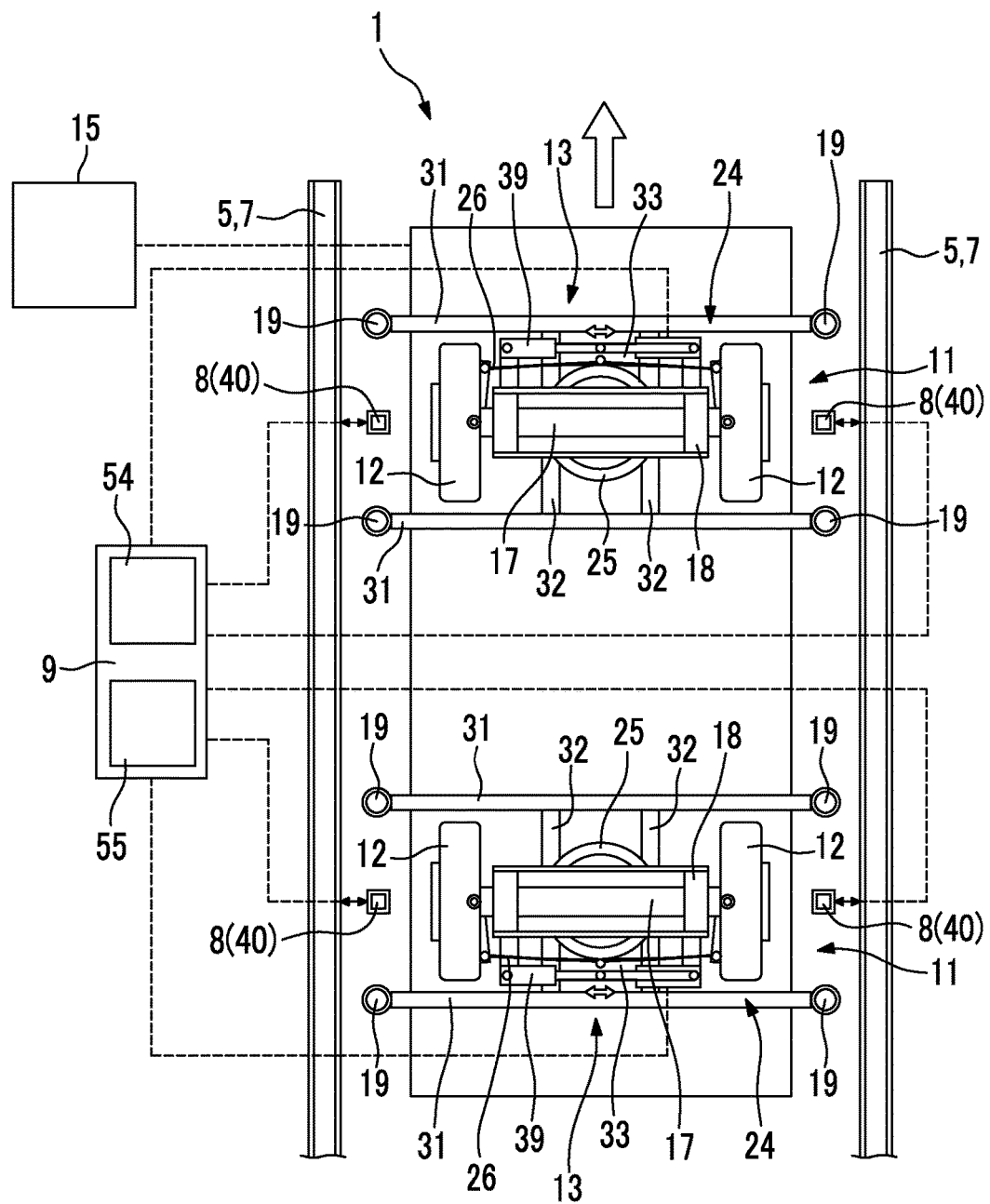
FIG. 2 is a plan view of a running device of the track transportation system according to the first embodiment of the invention.
Figure 3:
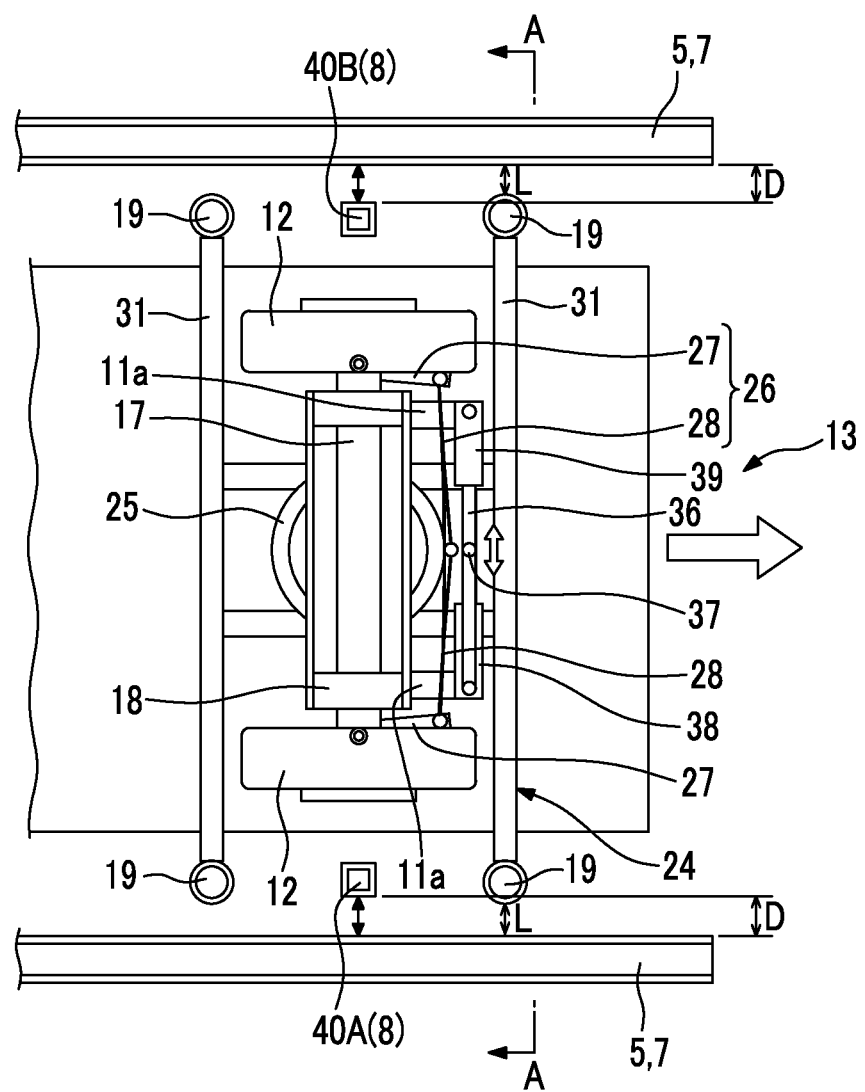
FIG. 3 is a plan view showing main parts of the running device of the track transportation system according to the first embodiment of the invention.
Figure 4:
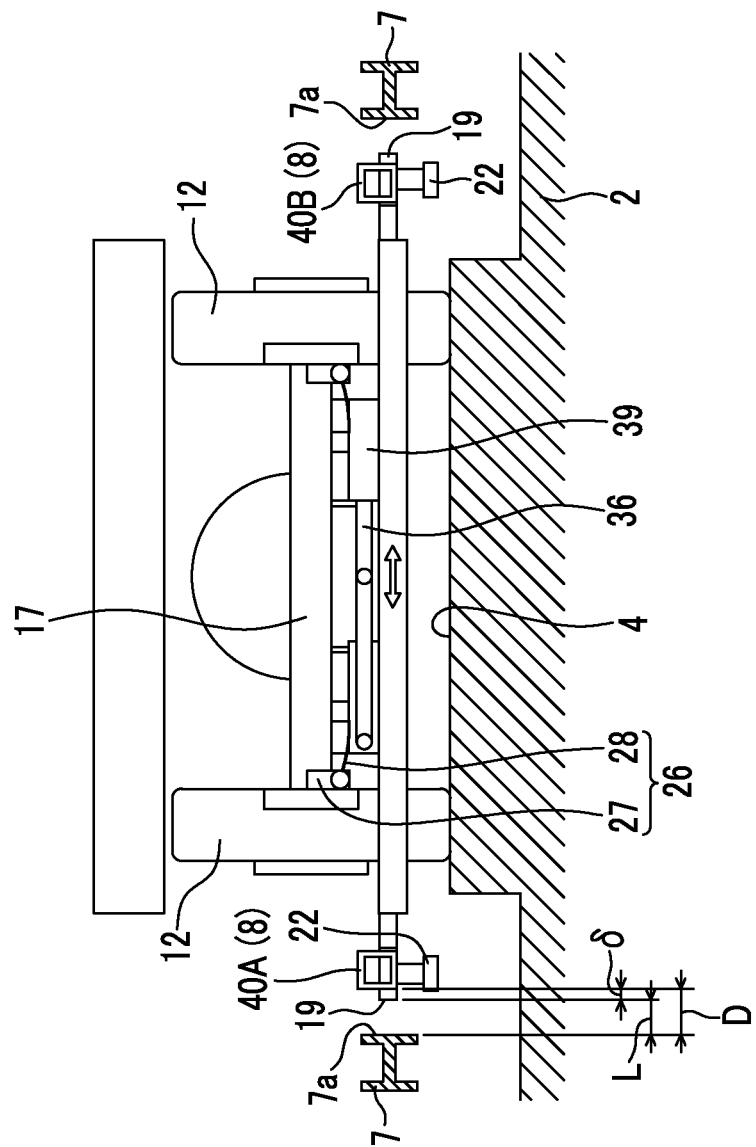
FIG. 4 is a view showing main parts of the running device of the track transportation system according to the first embodiment of the invention, and shows a cross-section taken along line A-A of FIG. 3.

As shown in FIGS. 1 and 2, the transport system 1 is formed of a so-called side guide type system including a vehicle 3, a track 2 on which the vehicle 3 travels, an operational control unit 15 that allows the vehicle 3 to travel according to an operational plan by controlling supply of power to the vehicle 3, and guide rails 7 that guide the vehicle 3 on both left and right sides of the track 2 in a width direction and are made of steel. In the side guide type system, the vehicle 3 travels while being guided on both left and right sides in a width direction.

Here, a longitudinal direction is defined while the front side of the vehicle 3 in a traveling direction is simply defined as the front side, and a transverse direction is defined while the right side of the vehicle, which faces the front side, is defined as the right side and the left side thereof is defined as the left side.

As shown in FIGS. 1 to 4, the vehicle 3 includes a vehicle body 10, two running devices 11 that support the vehicle body 10 from below on the front and rear sides of the vehicle 3 in the longitudinal direction, and power collectors 14 that are disposed on both left and right sides of the vehicle 3 in the width direction.

Further, the vehicle 3 includes position detection parts 8 that detect the travel position of the vehicle 3 and a control unit 9 that steers the vehicle 3 according to signals output from the position detection parts 8.

The vehicle body 10 has a rectangular parallelepiped shape, is provided above the running devices 11, and accommodates passengers therein.

Each of the running devices 11 includes a pair of (left and right) running wheels 12, an axle 17 that connects the pair of running wheels 12, a suspension 18 that supports the axle 17 and the pair of running wheels 12, guide wheels 19 that are provided so as to face the guide rails 7, and a steering mechanism 13 that steers the running wheels 12.

Here, the two running devices 11 are provided below the vehicle body 10 so as to be symmetrical with each other in the longitudinal direction, and the front running device 11 will be described below on behalf of the two running devices.

A pair of running wheels 12 are provided on the left and right sides of each running device 11 with an interval therebetween, and the vehicle can travel on the track 2 through the rolling of the running wheels 12.

The axle 17 has the shape of a rod that has a center on an axis extending to the left and right in the width direction, and is rotated about this axis together with the running wheels 12.

The suspension 18 supports the axle 17 and the running wheels 12, and absorbs impact applied from the track 2.

The guide wheels 19 are provided on the running device 11 so as to be disposed on the left and right sides of the vehicle 3, and roll about axes parallel to a vertical direction when coming into contact with the above-mentioned guide rails 7. Further, portions of the guide wheels coming into contact with the guide rails, that is, the outer peripheral portions of the guide wheels 19 are made of, for example, an elastic material such as urethane rubber. In this embodiment, the guide wheels 19 are provided on the front and rear sides of the running wheels 12 and on both the left and right sides thereof, that is, a total of four guide wheels are provided on one running device 11.

Meanwhile, switching guide wheels 22 are provided below the guide wheels 19, and guide the vehicle 3 in a branch direction by rolling when coming into contact with branch guide rails (not shown) provided on the track 2 at a branched portion of the track 2.

The steering mechanism 13 includes a support frame 24 that supports the guide wheels 19 at left and right ends thereof in the width direction so as to allow the guide wheels 19 to roll, a turning bearing 25 that supports the support frame 24 so as to allow the support frame 24 to turn about a pivot perpendicular to the floor of the vehicle body 10, steering links 26 that steer the running wheels 12 according to the turning of the support frame 24, and an actuator 39 that applies a turning force to the support frame 24.

The support frame 24 includes a pair of (front and rear) first transverse beams 31 that extend to the left and right in the width direction and are disposed on the front and rear sides of the axle 17, a pair of (left and right) longitudinal beams 32 that extend in the longitudinal direction and connect the pair of (front and rear) first transverse beams 31, and a second transverse beam 33 that extends to the left and right in the width direction so as to connect the pair of longitudinal beams 32. The second transverse beam 33 is disposed along the first transverse beam 31 on the rear side of the front first transverse beam 31.

One of an outer race and an inner race of the turning bearing 25 is fixed to the support frame 24, and the other thereof is fixed to the suspension 18.

The steering link 26 includes a steering arm 27 that oscillates integrally with the running wheel 12 relative to a king pin (not shown) of the running wheel 12, and a steering rod 28 that connects the steering arm 27 to the second transverse beam 33. One end portion of the steering rod 28 is coupled to an end portion of the steering arm 27 by a pin, and the other end portion thereof is connected to the middle portion of the second transverse beam 33 by a pin.

The actuator 39 is, for example, a hydraulic cylinder including a movable rod 36, or the like. A cylinder part of the actuator 39 is mounted on a predetermined frame 11a of the running device 11 so that the moving direction of the movable rod 36 is parallel to the transverse direction. An end portion of the movable rod 36 is connected to the middle portion of the second transverse beam 33 of the support frame 24 by a connecting pin 37.

The power collector 14 allows the running wheels 12 to rotate by supplying power to an electric motor (not shown) when coming into contact with a trolley wire 6 provided on the track 2.

The track 2 includes a traveling road surface 4 on which the vehicle 3 travels through the rolling of the running wheels 12, and side walls 5 that stand up on both left and right side on the traveling road surface 4 in the width direction so as to surround the vehicle 3.

The operational control unit 15 is provided outside the vehicle 3, and controls power, which is supplied to the vehicle 3 from the trolley wire 6, or the like on the basis of an operational plan, such as stop positions or travel speed.

The guide rails 7 extend in the longitudinal direction along the inner surfaces of the side walls 5 of the track 2. That is, the guide rails 7 are provided so as to cross the traveling road surface 4. Further, the surfaces of the guide rails 7 facing the vehicle 3 in the transverse direction form guide faces 7a (an object to be measured), and the guide faces 7a guide the vehicle 3 by allowing the guide wheels 19 to roll when the outer peripheral portions of the guide wheels 19 come into contact with the guide faces 7a.

Here, in this embodiment, a distance between the guide face 7a and the guide wheel 19 is set to L while the vehicle 3 is positioned at a middle position of the track 2 in the transverse direction.

Next, the position detection parts 8 and the control unit 9 of the vehicle 3 will be described.

The pair of (left and right) position detection parts 8 are mounted on the support frame 24 of the running device 11 or the vehicle body 10 by brackets (not shown) or the like so as to be disposed between the wheels 12 and the side walls 5 of the track 2 on the extension of a rotation axis of the axle 17.

Each of the position detection parts 8 includes a sensor 40 that detects a distance between the guide face 7a of the guide rail 7 and itself. In this embodiment, the sensors 40 are disposed at substantially the same position in the vertical direction so as to face the guide faces 7a on the left and right sides in the width direction. Further, in this embodiment, a distance between the guide face 7a and the sensor 40 is set to "L+δ" (hereinafter, referred to as D) that is larger than a distance L between the guide face 7a and the guide wheel 19 while the vehicle 3 is positioned in the middle of the track 2 in the transverse direction.

Furthermore, a sensor 40 having characteristics in which an output is increased as the sensor becomes distant from the guide face 7a and the rate of change of the output of the sensor is reduced in a range in which a distance between the guide face 7a and the sensor is equal to or larger than a predetermined value can be used as the sensor 40. Moreover, a short-range eddy current type displacement sensor (eddy current sensor) of which a measurement distance is about 0.5D (a half of D) is used as an example of this sensor 40 in this embodiment. Accordingly, when the distance between the guide face 7a and the sensor exceeds 0.5D, the rate of change of the output of the sensor is reduced, that is, the output of the sensor is saturated.

The control unit 9 includes a steering amount calculating unit 54 that combines the outputs of the pair of sensors 40 and determines the amount of steering of the running wheels 12 from a combined output, and a steerage drive order unit 55 that outputs the amount of steering determined by the steering amount calculating unit 54 and steers the running wheels 12.

Here, the control unit 9 is mounted on the vehicle 3 in this embodiment, but may be provided outside the vehicle 3. Meanwhile, it seems that the control unit 9 is provided outside the vehicle 3 in FIG. 2, but the control unit 9 is actually mounted on the vehicle 3.

The steerage drive order unit 55 operates the actuator 39 by driving a motor or the like on the basis of the amount of steering of the running wheels 12 determined by the steering amount calculating unit 54. That is, the steerage drive order unit 55 allows the support frame 24, which forms the second transverse beam 33 by the connecting pin 37, to turn about the pivot by moving the movable rod 36 of the actuator 39. In this way, active steering control, in which the left and right running wheels 12 are steered, is performed through the steering rods 28 by the turning of the support frame 24.

A combined output of the pair of sensors 40 is generated as described below in the steering amount calculating unit 54. Here, the sensor 40 of the right position detection part 8 of the front running device is referred to as a sensor 40A, and the sensor 40 of the left position detection part 8 of the front running device is referred to as a sensor 40B. Meanwhile, the same sensors are used as the sensors 40A and 40B.

Figure 5:
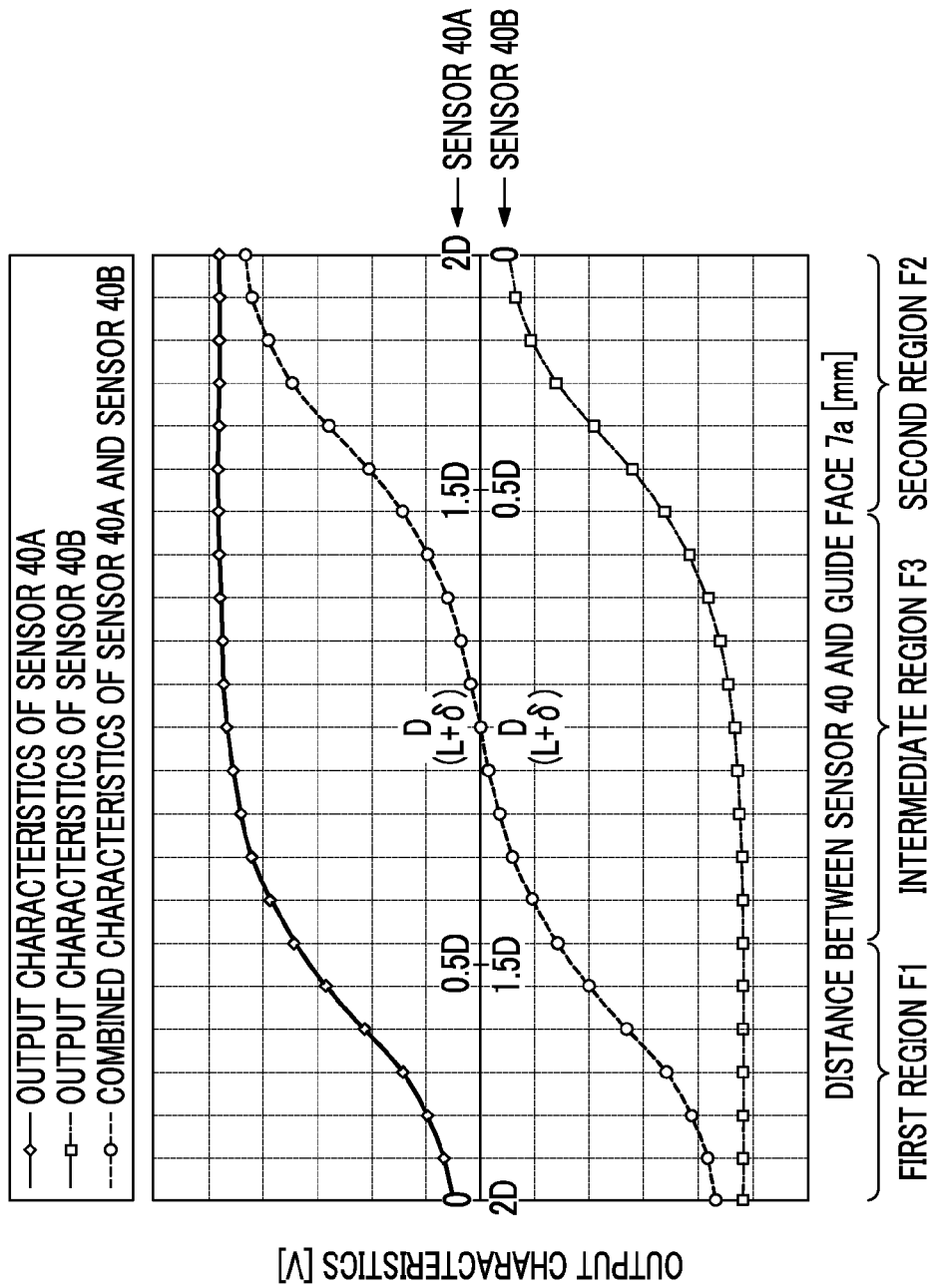
FIG. 5 is a view relating to the track transportation system according to the first embodiment of the invention and showing output characteristics of a sensor.

As shown in FIG. 5, the outputs of the sensors 40A and 40B have characteristics in which an output of the sensor is increased as the sensor becomes distant from the guide face 7a and the rate of change of the output of the sensor is reduced in a range in which a distance between the guide face 7a and the sensor is equal to or larger than a predetermined value as described above.

Further, when the vehicle 3 travels at a position closer to the right side than the middle position in the width direction, the sensor 40A is close to the guide face 7a and the sensor 40B is distant from the guide face 7a.

Accordingly, in a first region F1 in which the distance between the sensor 40A and the guide face 7a is in the range of about 0 to 0.5D and the distance between the sensor 40B and the guide face 7a is in the range of about 2D (2 times D) to 1.5D (1.5 times D), the output of the sensor 40A is changed (reduced) with a high rate of change and the rate of change of the output of the sensor 40B is reduced (an output signal becomes flat) while the output of the sensor 40B is large.

Here, the output of the sensor 40, which is an eddy current type displacement sensor, is a voltage value in this embodiment.

Furthermore, when the output of the sensor 40A as a positive value and the output of the sensor 40B as a negative value are combined with each other, this combined output approaches zero while being increased from a negative value with a high rate of change in the first region F1.

Further, conversely, when the vehicle 3 travels at a position closer to the left side than the middle position in the transverse direction, the sensor 40A is distant from the guide face 7a and the sensor 40B is close to the guide face 7a.

Accordingly, in a second region F2 in which the distance between the sensor 40A and the guide face 7a is in the range of about 2D to 1.5D and the distance between the sensor 40B and the guide face 7a is in the range of about 0 to 1.5D, the rate of change of the output of the sensor 40A is reduced (an output signal becomes flat) and the output of the sensor 40B is changed (increased) with a high rate of change while the output of the sensor 40A is large.

Furthermore, when the output of the sensor 40A as a positive value and the output of the sensor 40B as a negative value are combined with each other, this combined output is a positive value and is changed (increased) with a high rate of change in the second region F2.

Moreover, when the vehicle 3 travels at a middle position on the traveling road surface 4 in the width direction, the distance between the sensor 40A and the guide face 7a is substantially equal to the distance between the sensor 40B and the guide face 7a.

Accordingly, a transition state between a state in which the output of the sensor 40 is greatly changed (increased or reduced) and a state in which the rate of change of the output of the sensor is low appears in an intermediate region F3 between the first and second regions F1 and F2 in which these distances are in the range of about 0.5D to about 1.5D.

Further, in the intermediate region F3, when the output of the sensor 40A as a positive value and the output of the sensor 40B as a negative value are combined with each other, this combined output is in a transition state in which the output is gently changed (increased) to a positive value from a negative value in the second region F2 through a state in which the output is zero.

In consideration of the combined output of the sensors 40A and 40B through the first region F1, the intermediate region F3, and the second region F2, the sensor has output characteristics in which the combined output is greatly increased first in order of the first region F1, the intermediate region F3, and the second region F2, is gently increased at a low rate of change, and is then greatly increased again.

When the travel position of the vehicle 3 is present near the middle position on the traveling road surface 4 of the track 2 in the width direction in this transport system 1, that is, when the distance between the guide wheel 19 and the guide face 7a is close to L in this embodiment, the distance between each of the two sensors 40 (40A and 40B) and the guide face 7a is close to D. In this case, the combined output of the sensors 40 (40A and 40B) is positioned in the intermediate region F3. Accordingly, when the vehicle 3 is present at the exact middle position, the combined output of the sensors 40 (40A and 40B) is zero.

Meanwhile, since the combined output of the sensors 40 (40A and 40B) is positioned in the first and second regions F1 and F2 when the travel position of the vehicle 3 deviates laterally from the middle position on the traveling road surface 4 in the width direction, the rate of change of the output is increased.

Accordingly, when the vehicle 3 deviates from the middle position on the traveling road surface 4 in the width direction, the steering of the running wheels 12 can be controlled according to a combined output signal having a high rate of change by the control unit 9 so that the vehicle promptly returns to the middle position. Further, when the vehicle is close to the middle position, the steering control of the running wheels can be moderately performed according to a combined output signal having a low rate of change. In other words, when the vehicle 3 travels at a position deviating from the middle position of the track 2 in the width direction, the reaction speed of the steering is high. However, when the vehicle is close to the middle position, the reaction speed of the steering is lowered.

Accordingly, even though the vehicle 3 is to travel on one side due to vibrations, disturbances, or the like, the vehicle 3 does not overshoot the middle position when the vehicle 3 returns to the middle position. For this reason, since the meandering travel of the vehicle, which is caused by the repetition of this movement of the vehicle, does not occur, it is possible to make the vehicle 3 reliably travel at the middle position on the traveling road surface 4 in the width direction.

In addition, the control unit 9 uses very simple control for combining the outputs of the two sensors 40 (40A and 40B) and steering the running wheels 12 by operating the actuator 39 according to the combined output of the sensors. For this reason, control delay hardly occurs. Accordingly, since steering control can be reliably performed even though the vehicle 3 travels at a high speed, the vehicle can travel at the middle position.

Further, since the sensors 40 (40A and 40B) of which the measurement distances are short can be used as the sensors 40 (40A and 40B) of the position detection parts 8, it is possible to reduce the size and weight of the sensors 40 (40A and 40B). As a result, costs are also reduced.

Furthermore, since each of the sensors 40 (40A and 40B) of the position detection parts 8 measures the distance between the guide face 7a of the guide rail 7 and itself and an output signal is generated by the control unit 9 on the basis of the measured distance, objects, which are used to measure a distance, do not need to be provided separately from the guide rails 7. Accordingly, since man hours for the installation of the objects, which are used to measure a distance, are not required, costs can be reduced.

According to the transport system 1 of this embodiment, since steering control can be performed through the combination of the outputs of the sensors 40 (40A and 40B) of the pair of position detection parts 8, it is possible to make the vehicle more reliably travel on a desired course by simple control.

Here, the sensors 40 (40A and 40B) of the position detection parts 8 are not limited to eddy current type displacement sensors, and may be, for example, capacitive displacement sensors or saturation type sensors that are saturated to a predetermined value at which at least an output is present. Meanwhile, output characteristics of the sensors 40 (40A and 40B) need to be selected in consideration of various parameters, such as the travel speed of the vehicle 3 and a distance between the guide face 7a and the guide wheel 19.

Further, it is preferable that the positions of the sensors 40 (40A and 40B) are positions present on the extension of the rotation axis of the axle 17. However, the positions of the sensors 40 (40A and 40B) are not necessarily limited thereto, and may deviate from the positions in the longitudinal direction. As long as the distance between the guide face 7a and the sensor can be measured, the vertical positions of the sensors are also not limited to the above-mentioned embodiment. However, the sensors 40 (40A and 40B) need to be positioned so that the distance between the guide face 7a and the other sensor 40 is increased when the distance between the guide face 7a and one sensor 40 is reduced.

Meanwhile, since the same sensors are used as the sensors 40A and 40B and the travel position of the vehicle 3 is the middle position on the traveling road surface 4 in this embodiment, the distances between the guide faces 7a and the respective sensors 40 in the transverse direction need to be equal to each other while the vehicle 3 is present at the middle position.

Figure 6:
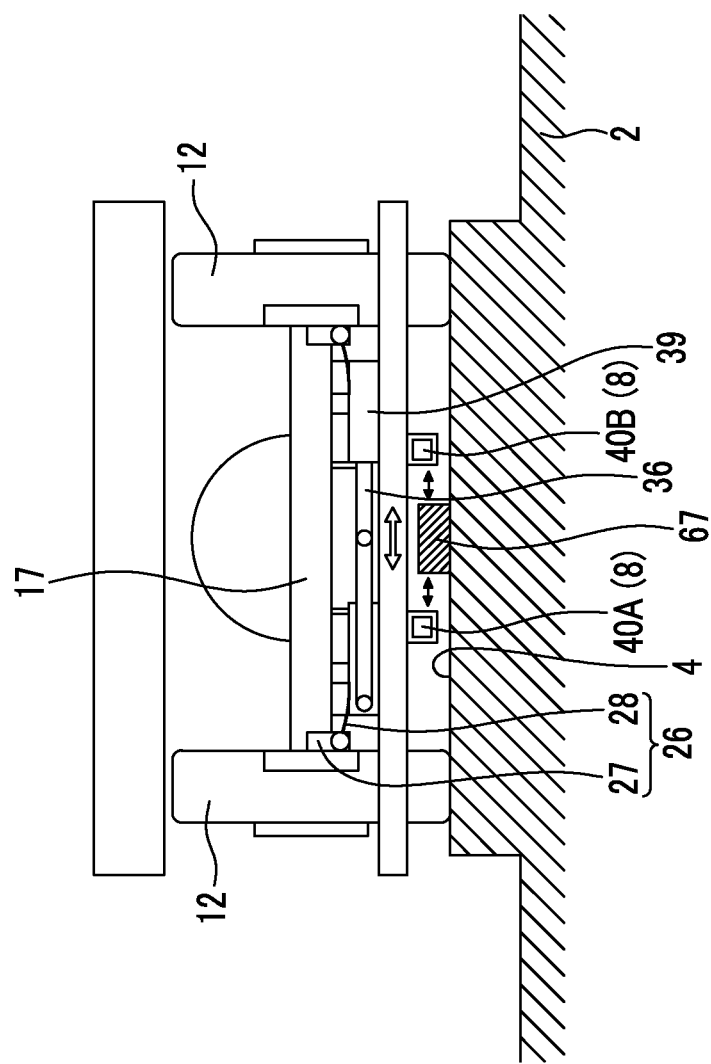
FIG. 6 is a view showing main parts of a running device of a track transportation system according to a first modification of the first embodiment of the invention and shows a cross-section at the same position as the cross-section taken along line A-A of FIG. 3.

Here, as shown in FIG. 6, the sensors 40A and 40B may be disposed between the two (left and right) running wheels 12 of the running device, an object 67 to be measured, which protrudes upward, may be provided at the middle position on the traveling road surface 4 in the width direction so as to be interposed between the sensors 40A and 40B, and the steering control of the vehicle 3 may be performed by this configuration. That is, since the object 67 to be measured is separately provided, the steering control of this embodiment can also be applied to the track that is not provided with the guide rails 7. Further, although not shown, such an object 67 to be measured may be provided along the side walls 5 of the track 2.

Figure 7:
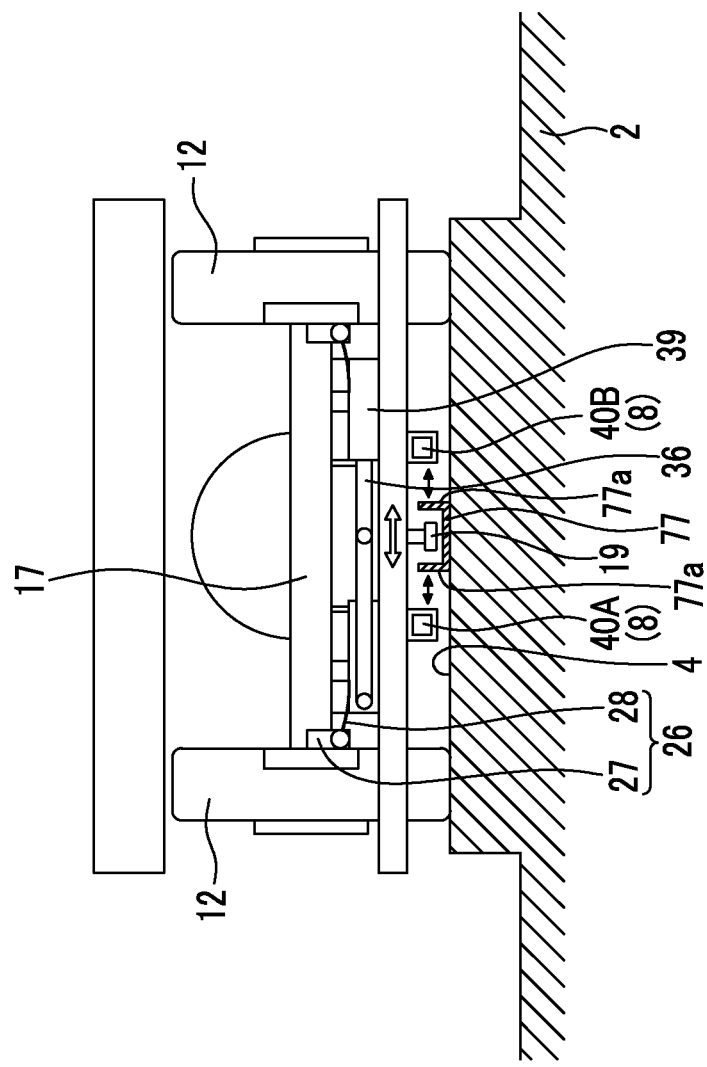
FIG. 7 is a view showing main parts of a running device of a track transportation system according to a second modification of the first embodiment of the invention and shows a cross-section at the same position as the cross-section taken along line A-A of FIG. 3.

Furthermore, the steering control of this embodiment can also be applied to a center guide type transport system 1 in which a guide rail 77 is provided on a traveling road surface 4 at the middle position of a track 2 as shown in FIG. 7. In this case, the sensors 40 measure distances between themselves and surfaces 77a (objects to be measured) of the guide rail 77 that face the inner surfaces of two side walls 5 of the track 2.

Moreover, the distance L between the guide face 7a and the guide wheel 19, the distance D between the guide face 7a and the sensor 40, the measurement distance 0.5D of the sensor 40, and the like, which have been described above, are merely illustrative, and these distances do not necessarily need to satisfy the above-mentioned relationship. That is, since the relationship between these distances also varies according to the type or characteristics of the sensor 40, these distances need to be appropriately set according to the sensor 40.

Second Embodiment

Next, a transport system 1A according to a second embodiment of the invention will be described.

Components, which are common to the first embodiment, are denoted by the same reference numerals as those of the first embodiment and the detailed description thereof will be omitted.

The transport system 1A of this embodiment includes a structure 82 instead of the guide faces 7a of the guide rails, and position detection parts 80 of the transport system 1A are different from those of the first embodiment.

As shown in FIG. 8, a pair of (left and right) position detection parts 80 are mounted on a support frame 24 of a running device 11 or a vehicle body 10 by brackets (not shown) or the like so as to be disposed between two (left and right) running wheels 12 on a line segment parallel to the rotation axis of an axle 17.

Each of the position detection parts 80 includes a sensor 81 that detects a distance between the structure 82 and itself. In this embodiment, the sensors 81 are disposed obliquely above the structure 82 so as to face the structure 82. Further, in this embodiment, as in the first embodiment, a distance between the structure 82 and the sensor 81 is set to D while a vehicle 3 is positioned in the middle on a traveling road surface 4 in a width direction.

Furthermore, a sensor 81 having characteristics in which an output is increased as the distance between the structure 82 and the sensor 81 is reduced can be used as the sensor 81. Moreover, a laser sensor is used as an example of this sensor 81 in this embodiment.

Here, the sensor 81 of the right position detection parts 80 of the front running device is referred to as a sensor 81A, and the sensor 81 of the left position detection part 80 of the front running device is referred to as a sensor 81B.

The structure 82 is disposed between the two (left and right) running wheels 12 of the running device 11 so as to protrude upward at a middle position on the traveling road surface 4 in the width direction, and the surface of the structure 82, which faces up, forms a detection surface 83 (an object to be measured) that face the sensors 81 (81A and 81B).

The detection surface 83 is provided so that a distance between the detection surface 83 and the sensor 81B is increased when a distance between the detection surface 83 and the sensor 81A is reduced. That is, the structure 82 is provided at a middle position on the traveling road surface 4 so as be interposed between the sensors 81A and 81B.

In addition, the detection surface 83 is formed in a shape in which the distances between the detection surface 83 and the sensors 81 (81A and 81B) are reduced as the respective sensors 81 (81A and 81B) approach each other from the left and right sides in the width direction and the rate of change of the distance is reduced in a range in which the distance between the detection surface 83 and each of the sensors 81 (81A and 81B) is equal to or smaller than a predetermined value. That is, the detection surface 83 is provided so as to be symmetrical with respect to the middle position on the traveling road surface 4, and is formed in a shape in which the height of the detection surface 83 protruding upward is increased toward the middle position. Further, as a detailed shape, the shape of a portion, which faces the sensor 81A, of the detection surface 83 is the same as the shape of the line having the output characteristics of the sensor 40A shown in FIG. 5 described in the first embodiment. Furthermore, the shape of a portion, which faces the sensor 81B, of the detection surface 83 has a symmetrical shape that is obtained by inverting the shape of the shape of a portion, which faces the sensor 81A, of the detection surface 83 with respect to the middle position on the traveling road surface 4 in the width direction.

According to the transport system 1A, each of the sensors 81 (81A and 81B) of the position detection parts 80 is a laser sensor having output characteristics in which an output is increased as the sensor approaches the detection surface 83. Moreover, the detection surface 83 is formed in a shape in which the distances between the detection surface 83 and the sensors 81 (81A and 81B) are reduced as the sensors 81 (81A and 81B) approach each other in the width direction and the rate of change of the distance is reduced in a range in which the distance between the detection surface 83 and each of the sensors 81 (81A and 81B) is equal to or smaller than a predetermined value.

Accordingly, even though the sensors 81 (81A and 81B), which output linear output signals, like laser sensors are used, it is possible to obtain the same output signals as the output signals of the eddy current type displacement sensors, which have been described in the first embodiment, by forming the detection surface 83 in the above-mentioned shape.

For this reason, since steering control can be performed through the combination of the outputs of the sensors 81 (81A and 81B) of the pair of position detection parts 80, it is possible to make the vehicle more reliably travel on a desired course by simple control.

Here, the sensors 81 (81A and 81B) of the position detection parts 80 are not limited to laser sensors, and may be, for example, ultrasonic sensors or sensors capable of obtaining output signals that at least monotonously vary linearly. The output characteristics of the sensors 81 (81A and 81B) and the shape of the detection surface 83 need to be selected in consideration of various parameters, such as the travel speed of the vehicle 3 and a distance between the guide face 7a and the guide wheel 19.

Meanwhile, the structure 82 including the detection surface 83 may be provided on each of the left and right sides of the vehicle 3 in the width direction to perform steering control.

Preferred embodiments of the invention have been described above, but the invention is not limited to the embodiments. Components may be added, omitted, and substituted, and other alterations may be applied without departing from the gist of the invention. The invention is not limited by the above description and is limited by only the scope of accompanying claims.

INDUSTRIAL APPLICABILITY

The invention relates to a vehicle that can be automatically steered, and a track transportation system that includes a track including a travel road on which the vehicle travels. According to the track transportation system of the invention, since steering control can be performed through the combination of outputs of sensors of a pair of position detection parts, it is possible to make a vehicle more reliably travel on a desired course by simple control.

REFERENCE SIGNS LIST

1: (TRACK-BASED) TRANSPORT SYSTEM
2: TRACK
3: VEHICLE
4: TRAVELING ROAD SURFACE
5: SIDE WALL
6: TROLLEY WIRE
7: GUIDE RAILS
7A: GUIDE FACE (OBJECT TO BE MEASURED)
8: POSITION DETECTION PART
9: CONTROL UNIT
10: VEHICLE BODY
11: RUNNING DEVICE
11A: FRAME
12: RUNNING WHEEL
13: STEERING MECHANISM
14: POWER COLLECTOR
15: OPERATIONAL CONTROL UNIT
17: AXLE

18: SUSPENSION
19: GUIDE WHEEL
22: SWITCHING GUIDE WHEEL
24: SUPPORT FRAME
25: TURNING BEARING
26: STEERING LINK
27: STEERING ARM
28: STEERING ROD
31: FIRST TRANSVERSE BEAM
32: LONGITUDINAL BEAM
33: SECOND TRANSVERSE BEAM
36: MOVABLE ROD
37: CONNECTING PIN
39: ACTUATOR
40 (40A, 40B): SENSOR
54: STEERING AMOUNT CALCULATING UNIT
55: STEERAGE DRIVE ORDER UNIT
F1: FIRST REGION
F2: SECOND REGION
F3: INTERMEDIATE REGION
67: OBJECT TO BE MEASURED
77: GUIDE RAIL
77A: SURFACE
1A: TRANSPORT SYSTEM
80: POSITION DETECTION PART
81 (81A, 81B): SENSOR
82: STRUCTURE
83: DETECTION SURFACE (OBJECT TO BE MEASURED)

The invention claimed is:

1. A vehicle comprising:
running wheels that travel on a traveling road surface of a track that has side walls that stand up on both left and right sides of the travelling road surface;
a pair of position detection parts that is provided with an interval therebetween in a width direction, and is configured to detect distances between the pair of position detection parts and an object to be measured provided on the track along an extending direction of the traveling road surface, and output signals;
a control unit comprising a steering amount calculating unit configured to determine an amount of steering of the running wheels according to a combined output of the signals and a steerage drive order unit configured to output the amount of steering determined by the steering amount calculating unit and steer the running wheels; and
a steering mechanism configured to steer the running wheels according to the amount of steering output by the control unit,
wherein each of the pair of position detection parts is provided on an extension of a rotation axis of the running wheels and between one of the running wheels and one of the side walls.

2. The vehicle according to claim 1, wherein the pair of position detection parts outputs the signals so that a rate of change of the combined output of the signals is increased when the vehicle travels at a position deviating from a middle position on the traveling road surface in the width direction and the rate of change of the combined output of the signals is reduced when the vehicle travels at the middle position.

3. A track transportation system comprising:
the vehicle according to claim 1;
a track that includes a traveling road surface on which the vehicle travels;
an operational control unit that allows the vehicle to travel according to an operational plan by controlling supply of power to the vehicle; and
an object to be measured that is provided on the track along an extending direction of the traveling road surface.

4. The track transportation system according to claim 3, wherein each of the pair of position detection parts includes a sensor having characteristics in which an output of the signal is increased as a distance from the object to be measured is increased and a rate of change of the output of the signal is reduced in a range in which the distance from the object to be measured is equal to or larger than a predetermined value, and
the object to be measured is a guide face of a guide rail that extends in the extending direction of the traveling road surface so as to cross the traveling road surface.

5. The track transportation system according to claim 4, wherein the sensor is an eddy current sensor.

6. The track transportation system according to claim 3, wherein each of the pair of position detection parts includes a sensor having characteristics in which an output of the signal is increased as the distance from the object to be measured is reduced, and
the object to be measured is formed in a shape in which a distance between the object to be measured and the sensor is reduced as the object to be measured approaches the sensor in the width direction and a rate of change of the distance is reduced in a range in which the distance between the object to be measured and the sensor is equal to or smaller than a predetermined value.

7. The track transportation system according to claim 6, wherein the sensor is a laser sensor.

8. A track transportation system comprising:
the vehicle according to claim 2;
a track that includes a traveling road surface on which the vehicle travels;
an operational control unit that allows the vehicle to travel according to an operational plan by controlling supply of power to the vehicle; and
an object to be measured that is provided on the track along an extending direction of the traveling road surface.

9. The track transportation system according to claim 8, wherein each of the pair of position detection parts includes a sensor having characteristics in which an output of the signal is increased as a distance from the object to be measured is increased and a rate of change of the output of the signal is reduced in a range in which the distance from the object to be measured is equal to or larger than a predetermined value, and
the object to be measured is a guide face of a guide rail that extends in the extending direction of the traveling road surface so as to cross the traveling road surface.

10. The track transportation system according to claim 9, wherein the sensor is an eddy current sensor.

11. The track transportation system according to claim 8, wherein each of the pair of position detection parts includes a sensor having characteristics in which an output of the signal is increased as the distance from the object to be measured is reduced, and
the object to be measured is formed in a shape in which a distance between the object to be measured and the sensor is reduced as the object to be measured approaches the sensor in the width direction and a rate of change of the distance is reduced in a range in which the distance between the object to be measured and the sensor is equal to or smaller than a predetermined value.

12. The track transportation system according to claim 11, wherein the sensor is a laser sensor.

13. The vehicle according to claim 1, further comprising guide wheels that are arranged to face the side walls and horizontally rotate when the guide wheels contact the side walls, and a support frame that extends between the guide wheels and supports the guide wheels, wherein the pair of position detection parts is mounted on the support frame and arranged between the guide wheels in the extending direction of the traveling road surface.

* * * * *